United States Patent [19]

Klüting et al.

[11] Patent Number: 4,518,190
[45] Date of Patent: May 21, 1985

[54] HINGE UNIT FOR A SEAT, PARTICULARLY A POWER VEHICLE SEAT

[75] Inventors: Bernd Klüting, Radevormwald, Fed. Rep. of Germany; Vikram H. Zaveri, Springfield, Mich.

[73] Assignee: Keiper Automobiltechnik GmbH & Co. KG, Remscheid, Fed. Rep. of Germany

[21] Appl. No.: 328,103

[22] Filed: Dec. 7, 1981

[30] Foreign Application Priority Data

Dec. 12, 1980 [DE] Fed. Rep. of Germany ....... 3046888

[51] Int. Cl.³ .............................................. B60N 1/02
[52] U.S. Cl. ................................. 296/65 R; 180/286; 296/68; 297/379
[58] Field of Search ......................... 296/63, 65 R, 68; 180/286, 282; 297/378, 379

[56] References Cited

U.S. PATENT DOCUMENTS

| | | | |
|---|---|---|---|
| 2,927,655 | 3/1960 | Leslie | 296/63 |
| 3,387,885 | 6/1968 | Boschen | 297/379 |
| 3,655,240 | 4/1972 | Du Rocher | 297/379 |
| 3,756,655 | 9/1973 | Perkins | 297/379 |
| 3,761,730 | 9/1973 | Wright | 296/63 |
| 4,302,030 | 11/1981 | Clay | 180/286 |
| 4,318,569 | 3/1982 | Bilenchi | 297/379 |
| 4,345,665 | 8/1982 | Föhl | 280/806 |
| 4,366,984 | 1/1983 | Klueting | 297/379 |

Primary Examiner—Bruce H. Stoner, Jr.
Assistant Examiner—John A. Carroll
Attorney, Agent, or Firm—Michael J. Striker

[57] ABSTRACT

A hinge unit for a seat, particularly an automotive vehicle seat, has a fixed hinge element associated with a seat part of a seat and including an upper region provided with a recess with an end abutment, a pivotable hinge element associated with a back part of the seat and pivotably connected with the fixed hinge element, a two-side catch lever pivotally connected with the pivotable hinge element and having a locking projection engageable with the abutment of the fixed hinge element and a heavy arm with a weight urging the catch lever so that the projection assumes its free position, and a retaining element urging the catch lever so that the latter assumes its locking position.

9 Claims, 3 Drawing Figures

HINGE UNIT FOR A SEAT, PARTICULARLY A POWER VEHICLE SEAT

BACKGROUND OF THE INVENTION

The present invention relates to a hinge unit for a seat, particularly for a seat of a power vehicle.

Units of this general type are known in the art. A known hinge unit includes a fixed hinge element associated with a seat part of a seat, and a pivotable hinge element associated with a back part of the seat and pivotally connected with the seat part. The fixed hinge part has a recess in its upper region, and a two-sided catch lever is pivotally mounted on the pivotable hinge part and has a locking projection abutting against an abutment at one end of the recess, and a heavy arm which urges under the action of its own weight the locking projection to its free position. The above mentioned catch lever is angular, and its heavy arm has an abutment edge which together with a sliding face associated with the fixed hinge element turns back the engaging projection of the catch lever during the forward swinging of the back part from abutment of the fixed part. The heavy arm of the catch lever is thereby so designed and arranged that the force of inertia acting upon the catch lever holds the locking projection of the catch lever in its ready-to-lock position whereby in these cases the locking projection comes into contact against the abutment and prevents forward swinging of the back part. When, however, the back part is moved slowly, the force of inertia on the catch lever is negligibly small, so that the catch lever can turn over the sliding surface out of its ready-to-lock position. In vehicle seats in which the back part must be swung forwardly in order to make accessible the rear portion of particularly two-door cars, this construction possesses a considerable advantage, inasmuch as it allows a one-hand operation for forward swinging of the back part. In seats whose locking must be released by an additional lever, the back part can be adjusted conveniently only with both hands in such a manner that one hand releases the catch element whereas the other hand swings the back part. This is particularly inconvenient when packages or other objects must be held in one hand. The hinge unit operable by one hand possesses, however, the disadvantage that the locking projection in each case gets out of its ready-to-lock position when the back part is slowly moved forwardly. Because of this, there is a danger for the user of a vehicle seat when passengers occupying the rear part of the car support themselves during travel against the back part.

SUMMARY OF THE INVENTION

Accordingly, it is an object of the present invention to provide a hinge unit for a seat, particularly a vehicle seat, which avoids the disadvantages of the prior art.

More particularly, it is an object of the present invention to provide a hinge unit for a vehicle seat which retains the advantage of one-hand forward swinging of the back part for entering the rear of the car, and at the same time a forward turning of the back part during the vehicle's travel is excluded.

In keeping with these objects, and with others which will become apparent hereinafter, one feature of the present invention resides, briefly stated, in a hinge unit including a fixed hinge element, a pivotable hinge element, and a two-side catch lever with a locking projection and a heavy arm, wherein retaining means is provided urging the catch lever so that the latter assumes its locking position. The retaining means can be lifted if needed. The retaining means can be coupled to depend upon the ignition lock or the door movement, so that during travel the catch lever is retained in its ready-to-lock position. Because of this, undesirable subsequent forward turning of the back part during travel is reliably prevented.

Another advantageous feature of the present invention intends to reliably retain the catch lever in its locking position in condition of the action of accelerating and decelerating forces during accidents, and also to maintain the locking functions of the heavy arm of the catch lever in the inclined position of the back part. In accordance with this feature, the heavy arm of the catch lever forms a mass corresponding to the force of inertia, on the one hand, and, on the other hand, forms a lever center of gravity arranged so that, together with a lever pivot point in the position of use, it forms a center-of-gravity angle which is equal to or greater than the angle of inclination of the back part to a vertical line. Because of the formation of the catch lever as an inertia lever, the catch lever is reliably held in the locking position despite the failure of the retaining means, for example, in the event of an accident.

Still another feature of the present invention provides for reliable controlling of the catch lever in the event of forward turning of the back part required for the ignition access from the region of the abutment. In accordance with this feature, the catch lever has a control cog influencing the engaging projection and cooperating with a control curve of the fixed hinge element associated with the seat part. Several devices can be utilized for forming retaining means. It is advantageous when the retaining means is formed by an electromagnetic valve loaded with an accumulator. Instead of this magnetic valve, the retaining means can be formed as a bimetal spring cooperating with a heating device and urging the catch lever to its locking position.

Since the forward turning of the back part is required in each case when the vehicle doors are opened, it is advantageous when the retaining means, in accordance with a further feature of the present invention, is controlled by a switch contact depending upon the position of the doors. The operation of this switch contact is advantageously provided in such a manner that, in event the door is closed, the electromagnet or the heating device for the bimetal spring does not have current, whereas in the event of the door being open, current provides for pulling of the armature of the electromagnet or the bimetal spring from the catch lever, and the latter can turn freely and release the abutment.

Instead of retaining the catch lever by the force of inertia acting upon its heavy arm, a centrifugal switch which is integrated in a circuit of the door-position-dependent switch contact can be provided. Thereby the displacement of the center of gravity of the catch lever into position facilitating the free turning is possible, without lifting the detention means of the catch lever in the event of an accident and door opening required therefor. The centrifugal switch may be formed as a known structural element which has a contact mass movable under the action of the centrifugal force in an inclined plane.

The novel features which are considered characteristic for the invention are set forth in particular in the appended claims. The invention itself, however, both as

DESCRIPTION OF THE PREFERRED EMBODIMENTS

Figure 1:
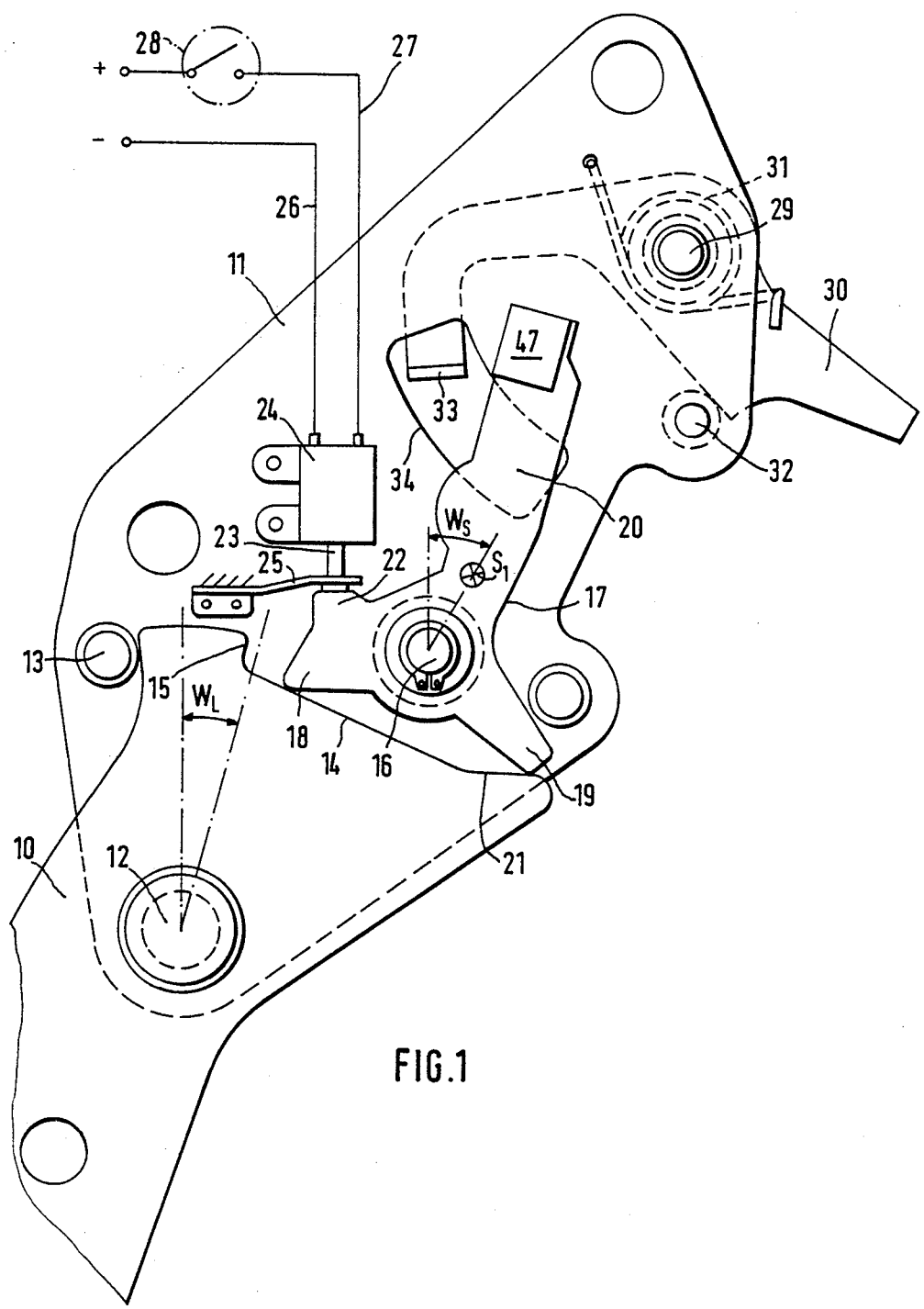
FIG. 1 is a view showing a hinge unit for a seat, in accordance with the present invention.

A hinge unit arranged at both sides of a vehicle seat between its seat part and its back part has a lower lever hinge element 10 connected with the seat part and an upper lever hinge element 11 connected with the back part. The hinge elements 10 and 11 are connected with one another by a pivot pin 12 about which the upper hinge element 11 pivots.

An abutment pin 13 is mounted on the upper hinge element 11 and serves for limiting the turning movement in a rearward direction. The abutment pin 13 comes into abutment against the front side of the lower hinge element 11 when the upper hinge element assumes its rear position. In order to fix the upper hinge element 11 in the position of use on the lower hinge element 10, the lower hinge element 10 has at its upper side a recess 14 which is limited at its front side by an abutment face 15.

As can be seen from FIG. 1, a catch lever 17 is pivotally mounted on the upper hinge element 11 by a pin 16 fixedly connected with the latter. The catch lever 17 has a locking projection 18, on the one hand, and an oppositely located control cog 19, on the other hand. In the region between the locking projection 18 and the control cog 19, the catch lever transitions into a heavy arm 20. The arm 20 is arranged so that the center of gravity S1 of the catch lever 17 is located above the pivot pin, and because of the abutment of the control cog 19 against a control curve 21 of the lower hinge element 10, a center-of-gravity angle WS to a vertical line is provided which is at least equal to or greater than an inclination angle WL of the back part to the vertical line. The arm 20 can be provided at its upper end with a weight 47 so that the length of the arm can be reduced without changing the position of the center of gravity S1 relative to the pin 16.

The catch lever has an abutment nose 22 at the upper side of the locking projection 18. In locking position of the catch lever 17, an anchor 23 of an electromagnet 24 of a solenoid mounted on the upper hinge part 11 presses via a force accumulator 25 against the abutment nose 22. This accumulator is formed, for example, as a flat spring. The flat spring is mounted, on the one hand, on the upper hinge element 11, whereas the free end of the flat spring overlaps the collar of the armature 23 and presses against the abutment nose 22 of the catch lever 17. Thereby the catch lever 17 is located in its position as shown in FIG. 1 so that during forward turning of the upper hinge element the locking projection 18 comes into abutment against the abutment face 15, in the event that the back part connected with the upper hinge element 11 turns in a counterclockwise direction. In the position of the catch lever shown in FIG. 1, the upper hinge element 11 and the back part connected therewith are fixed in their inclined position.

The electromagnetic valve 24 is connected with a current network of the power vehicle via conductors 26 and 27, whereas both conductors are interrupted by a switch contact 28 in the position of use of the back part. The switch contact 28 is so coupled with the vehicle door that the switch contact 28 is closed with the door opened and is opened with the door closed, as can be seen in FIG. 1. When in the event of the open door the switch contact 28 is closed, the magnetic spool of the electromagnet 24 is energized and pulls the armature 23. The flat spring 25 is thereby lifted so that the armature 23 releases the abutment nose 22 and thereby the entire catch lever 17. When the back part is turned with the upper hinge part 11 connected therewith in counterclockwise direction, the weight of the catch lever 17 in the center of gravity S1 acts upon the control cog 19 so that it is retained in abutment against the control curve 21. By turning forwardly, the control cog 19 travels downwardly, so that the locking projection 18 turns out of the recess 14 over the abutment face 15. Thereby a subsequent forward turning of the back part is possible.

Since, in the event of the current drop or a defect in the switch contact, an unlocking of the catch lever 17 is possible despite the forward turning of the back part, a bearing pin 29 is provided on the upper hinge element 11, and an emergency lever 30 is supported on the bearing pin 29. The emergency lever is pressed against an abutment 32 of the upper hinge element 11, for example by a helical torsion spring 31, and normally releases the catch lever 17. The free end of the emergency lever adjusting arm extends with a bent part 33 into an elongated hole 34 in the upper hinge element 11 and acts, in the event of the emergency lever being turned in clockwise direction, upon the arm 20 of the catch lever 17 in clockwise direction, so that the locking projection 18 can turn out of the recess 14 during simultaneous turning of the back part.

Figure 2:
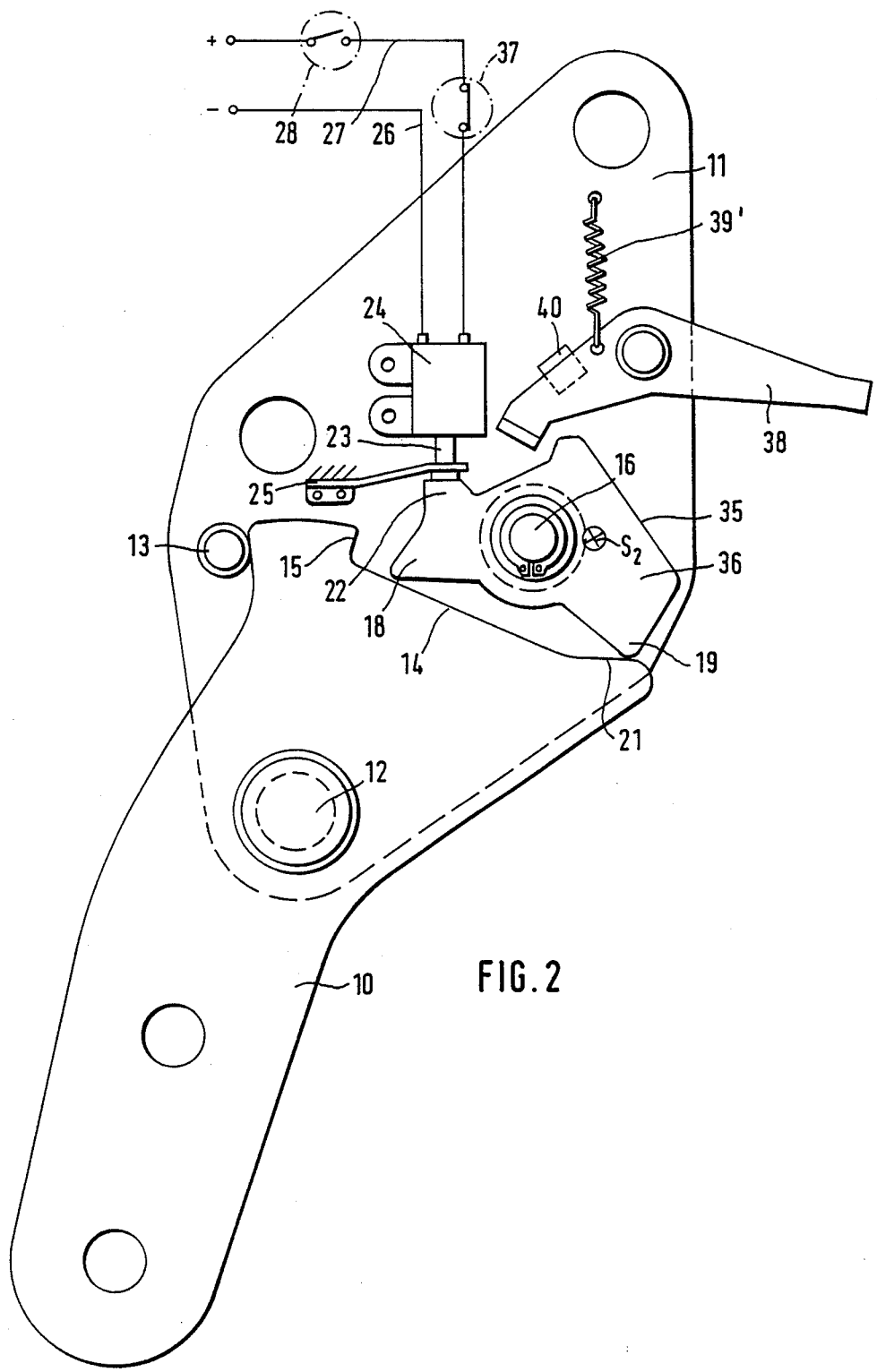
FIG. 2 is a view substantially corresponding to the view of FIG. 1, but showing the hinge unit in accordance with another embodiment of the present invention.

In the hinge unit shown in FIG. 2, a catch lever 35 also has the locking projection 18 and an abutment nose 22. However, the control cog 19 forms together with the heavy arm a joint lever arm 36. The center of gravity S2 moves near the pivot pin 16, so that the force of inertia no longer acts in the direction of turning of the catch lever 35. In order to guarantee that, during accidental breaking of the door, the catch lever 35 maintains its ready-to-lock position, a centrifugal switch 37 is integrated in one of the current conductors 26 and 27 in addition to the switch contacts 28 operating in dependence upon the door movement. The centrifugal switch 37 performs the locking functions which were performed in the hinge unit of FIG. 1 by the arm 20 serving as a mass of inertia.

The centrifugal switch 37 is so designed that, when the door breaks open and the switch contact 28 closes, the centrifugal switch 37 interrupts the current to the electromagnet 24, and thereby the spring 25 can hold the armature 23 in the locking position shown in FIG. 2. When centrifugal forces are not present or drop, the centrifugal switch 37 closes the current circuit, as can be seen from FIG. 2, so that with the open door and the thereby closed switch contact 28, the armature 23 of the electromagnet 24 is pulled against the force of the spring 25 and the abutment nose 22 of the catch lever 35 is released. As a result of this, by turning the upper hinge element 11 connected with the back part, the locking projection 18 turns, with the forwardly turned upper hinge element 11 because of sliding of the control cog 19 over the control curve 21, out of the recess 14 of the lower hinge element 10. Thus the back part can be turned forwardly. In the hinge unit of FIG. 2 an emergency lever 38 is also available which guarantees, in the event of current drop or failure, that the catch lever 35 can be turned from its locking position. In normal cases, the emergency lever 38 is held by a pulling spring 39' against an abutment 40 of the upper hinge element.

Figure 3:
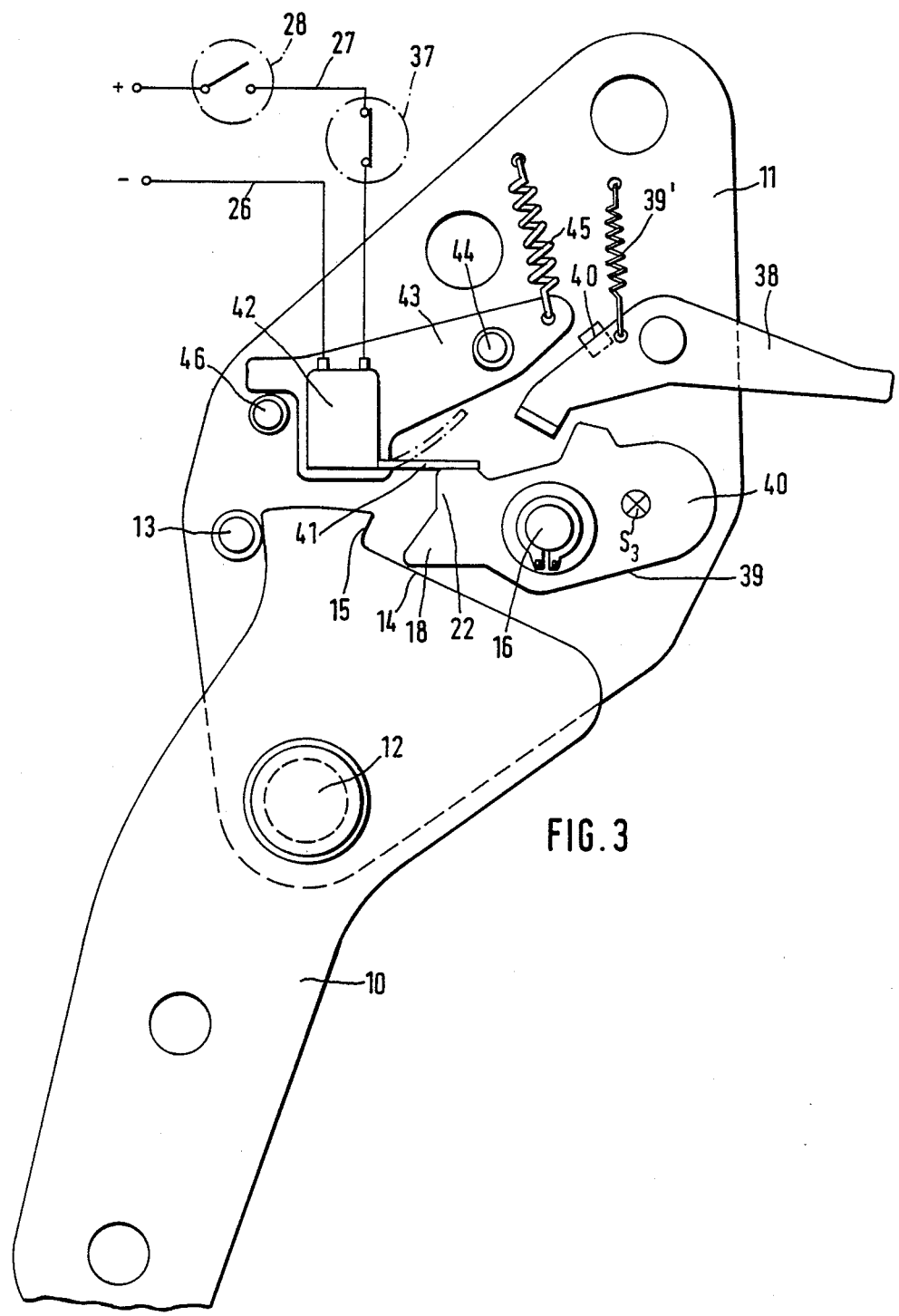
FIG. 3 is a view substantially corresponding to the view of FIG. 2, but showing still a further embodiment of the present invention.

A catch lever 39 of the hinge unit shown in FIG. 3 differs from the catch lever of the hinge unit of FIG. 2 in the fact that a control cog 19 can be completely dispensed with, and instead a heavy arm 40 can be utilized, so that the center of gravity of the catch lever 39 is located at such a distance laterally near the pin 16 that the catch lever 39 with released abutment nose 22 reliably turns in clockwise direction so that the locking projection 18 of the catch lever 39 turns over the abutment face 15 on the lower hinge element 10. In contrast to both the above described hinge units of FIGS. 1 and 2, the abutment nose 22 in the hinge unit of FIG. 3 is normally actuated by a bimetal spring 41. The bimetal spring 41 is connected with an electrical heating device 42 which is also connected by conductors 26 and 27 with the current network of the power vehicle. A heating device 42 is mounted in turn on a turning lever 43 which is pivotally supported on an axle 44 fixed on the upper hinge element 11. The turning lever 43 is pulled by a pulling spring 45 against an abutment pin 46 of the upper hinge element 11 so as to assume the position shown in FIG. 3.

A centrifugal switch 37 is integrated in one of the two current conductors 26, 27 near the switch contact 28 actuated by the movement of the door. The operation of the centrifugal switch 37 is identical to the operation of the centrifugal switch of the hinge unit shown in FIG. 2. When, normally, forces of inertia are not present, the centrifugal switch 37 remains in the position shown in FIG. 3, and the switch contact 28 interrupts the current flow in the event of the door being closed, as can be seen in FIG. 3. When the door is open, the current circuit is closed so that the heating device 42 is heated and bends the bimetal spring in the direction shown in dash-dot lines. Thereby the catch lever 39 is released and turns in clockwise direction so that its locking projection 18 turns over the abutment face 15.

In the event of accidental opening of the door, the switch contact 28, as described above, closes, but the centrifugal switch 37 opens because of the action of acceleration or deceleration forces, so that the heating device 42 remains without current, and the bimetal spring 41 holds the catch lever 39 in the locking position shown in FIG. 3. In the hinge unit of FIG. 3, the emergency lever 38 is also available and can turn the catch lever 39 during current drop or failure from its locking position. During turning of the catch lever 39 in clockwise direction, the abutment nose 22 presses the turning lever 43 via the bimetal spring 41 against the force of the pulling spring 45 upwardly. Thereby the locking projection 18 turns over the abutment face 15. Thus, turning of the back part of the seat in the event of an emergency is possible.

It will be understood that each of the elements described above, or two or more together, may also find a useful application in other types of constructions differing from the types described above.

While the invention has been illustrated and described as embodied in a hinge unit for a seat, particularly a vehicle seat, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications that, from the standpoint of prior art, fairly constitute essential characteristics of the generic or specific aspects of this invention.

What is claimed as new and desired to be protected by Letters Patent is set forth in the appended claims:

1. A hinge unit for a seat, particularly a seat of a power vehicle, comprising a fixed hinge element to be associated with a seat part of a seat and including an upper region provided with a recess having an end abutment; a pivotable hinge element to be associated with a back part of the seat and pivotally connected with said fixed hinge element; a two-sided catch lever formed as an inertia lever and pivotally connected with said pivotable hinge element, said catch lever having a locking projection engageable with said abutment of said fixed hinge element, and a heavy arm with a weight urging said catch lever so that said projection assumes its free position; and retaining means deactuatable in response to actuation of a control element of the power vehicle and urging said catch lever so that the latter assumes during power vehicle travel its locking position under the action of said retaining means, and in the event of an accident resulting in failure of said retaining means, said catch lever is also held in its locking position because it is formed as an inertia lever, under the action of inertia force, said retaining means including a heatable retaining element arranged to urge said catch lever to its locking position while being heated.

2. A hinge unit as defined in claim 1, wherein said pivotable hinge element is connected with said fixed hinge element by a pin, said catch lever being connected with said pivotable hinge element by a further pin.

3. A hinge unit as defined in claim 1, wherein said retaining means includes a retaining element which is liftable.

4. A hinge unit as defined in claim 1, wherein the back of the seat and thereby said pivotable hinge element forms a predetermined angle of inclination to a vertical line, said heavy arm of said catch lever having a mass corresponding to forces of inertia and forming a lever center of gravity located so that it forms with a pivot point of said catch lever a center-of-gravity angle to a vertical line, said center-of-gravity angle of said catch lever being at least equal to said angle of inclination of said pivotable hinge element.

5. A hinge unit as defined in claim 4, wherein said center-of-gravity angle of said catch lever is greater than said angle of inclination of said pivotable hinge element.

6. A hinge unit as defined in claim 1, wherein said retaining element is a bimetal spring, said retaining means further including a heating device for heating said bimetal spring.

7. A hinge unit as defined in claim 1, wherein said retaining means is arranged to operate in dependence upon a position of a door.

8. A hinge unit as defined in claim 7, wherein said retaining means also includes a switch contact depending upon a position of a door and controlling said retaining element.

9. A hinge unit as defined in claim 2, wherein said retaining means includes a switch circuit in which said door-position-dependent contact is incorporated, and a centrifugal switch is also incorporated in said switch circuit.

* * * * *